United States Patent [19]
Housel, III et al.

[11] Patent Number: 6,003,087
[45] Date of Patent: *Dec. 14, 1999

[54] CGI RESPONSE DIFFERENCING COMMUNICATION SYSTEM

[75] Inventors: Barron Cornelius Housel, III, Chapel Hill; David Bruce Lindquist, Raleigh, both of N.C.

[73] Assignee: International Business Machines Corporation, Armonk, N.Y.

[ * ] Notice: This patent is subject to a terminal disclaimer.

[21] Appl. No.: 08/939,724

[22] Filed: Oct. 3, 1997

Related U.S. Application Data

[63] Continuation-in-part of application No. 08/601,804, Feb. 15, 1996, Pat. No. 5,754,774.

[51] Int. Cl.$^6$ ...................................................... G06F 3/00
[52] U.S. Cl. .......................... 709/229; 709/232; 709/200
[58] Field of Search ........................ 395/200.59, 200.63, 395/200.3, 200.62; 709/229, 232, 200

[56] References Cited

U.S. PATENT DOCUMENTS

| | | | |
|---|---|---|---|
| 4,438,511 | 3/1984 | Baran ....................................... | 370/204 |
| 4,893,307 | 1/1990 | McKay et al. .......................... | 370/389 |
| 5,021,949 | 6/1991 | Morton et al. .......................... | 709/231 |
| 5,193,162 | 3/1993 | Bordsen et al. ........................ | 711/152 |
| 5,220,501 | 6/1993 | Lawlor et al. ............................ | 380/24 |

(List continued on next page.)

FOREIGN PATENT DOCUMENTS

| | | | |
|---|---|---|---|
| 0 524 123 A2 | 1/1993 | European Pat. Off. ........ | G06F 15/16 |
| 0 665 670 A3 | 1/1995 | European Pat. Off. ........ | H04L 29/06 |
| WO97/15020 | 4/1997 | WIPO .............................. | G06F 19/00 |
| WO97/30403 | 8/1997 | WIPO .............................. | G06F 17/30 |
| WO97/30538 | 8/1997 | WIPO .............................. | H04L 29/06 |
| WO97/30539 | 8/1997 | WIPO .............................. | H04L 29/06 |

OTHER PUBLICATIONS

IBM Technical Disclosure Bulletin, Method to Reduce Changed Data Sent Between Computer Systems, vol. 35, No. 1B, pp. 110–112.

Austin, et al., File Systems Caching in Large Point–to–Point Networks, *Software Engineering Journal*, vol. 7, No. 1, pp. 65–80 (Jan. 1992).

Nelson, et al., Caching in the Sprite Network File System, *Operating Systems Review*, vol. 21, No. 5, pp. 3–4 (1987).

(List continued on next page.)

*Primary Examiner*—Zarni Maung
*Assistant Examiner*—Saleh Najjar
*Attorney, Agent, or Firm*—Myers Bigel Sibley & Sajovec; Jeanine S. Ray-Yarletts

[57] ABSTRACT

A method, apparatus and computer program product for reducing the data transmitted over a communication link from a first application resident in a first computer and to a second application resident in a second computer wherein the data is transmitted over an external communication link. HTML data in response to specific data in a CGI request is stored in a cache resident in the first computer to create a server base cache entry. HTML data in response to the specific data in the CGI request is also stored in a cache resident in the second computer to create a client base cache entry. CGI requests and specific CGI data is evaluated to determine if a corresponding client base cache entry exists to provide a client base form. CGI requests and specific CGI data are interrogated to determine if a server base cache entry exists to provide a server base form. The data stream corresponding to the response HTML data is intercepted and compared to the server base form to provide difference data. The difference data is then sent to the second computer over the external communication link. The response HTML data is reconstructed from the client/server specific data stream received over the external communication link by combining the client base form with the difference data and provided to the second application. Creation of an extended cache key corresponding to the CGI form and the user input data is also provided.

18 Claims, 7 Drawing Sheets

U.S. PATENT DOCUMENTS

| | | | |
|---|---|---|---|
| 5,321,542 | 6/1994 | Freitas et al. | 359/172 |
| 5,412,654 | 5/1995 | Perkins | 370/312 |
| 5,442,633 | 8/1995 | Perkins et al. | 370/331 |
| 5,446,736 | 8/1995 | Gleeson et al. | 370/473 |
| 5,448,561 | 9/1995 | Kaiser et al. | 370/471 |
| 5,473,772 | 12/1995 | Halliwell et al. | 395/712 |
| 5,481,721 | 1/1996 | Serlet et al. | 709/303 |
| 5,511,208 | 4/1996 | Boyles et al. | 395/800 |
| 5,572,528 | 11/1996 | Shuen | 370/402 |
| 5,574,906 | 11/1996 | Morris | 707/1 |
| 5,581,558 | 12/1996 | Horney, II et al. | 370/401 |
| 5,600,834 | 2/1997 | Howard | 707/201 |
| 5,673,322 | 9/1997 | Pepe et al. | 380/49 |
| 5,737,536 | 4/1998 | Herrmann et al. | 395/200.59 |
| 5,751,963 | 5/1998 | Umetsu | 395/200.53 |
| 5,754,774 | 5/1998 | Bittinger et al. | 395/200.33 |
| 5,764,910 | 6/1998 | Shachar | 395/200.53 |
| 5,774,660 | 6/1998 | Brendel et al. | 395/200.31 |
| 5,829,023 | 10/1998 | Bishop | 711/211 |
| 5,850,517 | 12/1998 | Verkler et al. | 709/202 |
| 5,857,201 | 1/1999 | Wright, Jr .et al. | 707/104 |
| 5,859,971 | 1/1999 | Bittinger et al. | 395/200.33 |
| 5,867,661 | 2/1999 | Bittinger et al. | 709/227 |
| 5,870,558 | 2/1999 | Branton, Jr. et al. | 709/203 |
| 5,878,213 | 3/1999 | Bittinger et al. | 709/203 |

OTHER PUBLICATIONS

Huizinga, et al., Two–Level Client Caching and Disconnected Operation of Notebook Computers in Distributed Systems, *SIGICE Bulletin*, vol. 21, No. 1, pp. 9–14 (Jul. 1995).

Abstract, IBM Technical Disclosure Bulletin, Method for Transmitting Only Document Change Data, vol. 27, pp. 844–846 (Jun. 1984).

International Search Report for International Application No. PCT/US96/11555.

Hypertext Transfer Protocol—HTTP/1.0, HTTP Working Group, Berners–Lee, et al.—Internet–Draft (Jan. 19, 1996).

Basic HTTP; W3Ologo HTTP circa May 3, 1994.

ARTour, IBM Sales Brochure G325–3598–0 printed Sep. 1995.

ARTour, IBM Sales Brochure G325–3595–00, printed Sep. 1995.

IBM ARTour Technical Overview–Release 1; IBM Publication SB14–0110–00 (1995).

Bird, R., Advances in APPN architecture, *IBM Systems Journal*, vol. 34, No. 3, pp. 430–451 (1995).

Berners–Lee, T., et al., The World–Wide Web, *Communications of the Association for Computing Machinery*, vol. 37, No. 8, pp. 76–82 (Aug. 1994).

IBM ARTour Web Express Server Guide, First Edition (Feb. 1997).

IBM ARTour Web Express Server Guide, Second Edition (Jun. 1997).

CGI RESPONSE DIFFERENCING COMMUNICATION SYSTEM

RELATED APPLICATIONS

This application is a continuation-in-part (CIP) of application Ser. No. 601,804, filed Feb. 15, 1996, now U.S. Pat. No. 5,754,774.

FIELD OF THE INVENTION

The present invention relates to communications between client server applications such as a web browser and a web server. More particularly the present invention relates to communications over a low-speed or wireless communication link between two computers, one running a client application and the other running a server application.

BACKGROUND OF THE INVENTION

The recent publicity and emphasis on the "information superhighway" has increased awareness and acceptance of the Internet as a mass communication media. This broad based recognition of the Internet as a viable media for communication and interaction across multiple networks has also created a large established user base built upon the Internet standardized protocols for interaction between computer networks.

The paradigm for the Internet is that of a client-server relationship where Internet clients (browsers) communicate with Internet servers. To provide greater access to the Internet the communication protocols and languages utilized by the clients and servers have become standardized. These protocols include the Hyper-Text Transfer Protocol (HTTP), which is the communication protocol used for communications between clients and servers, and the Transfer Control Protocol/Internet Protocol (TCP/IP) the TCP portion of which is the transport specific protocol for communication between computers or applications. Also standardized is the language in which clients and servers communicate which is called Hyper-Text Markup Language (HTML). Because these protocols and language are machine independent, and utilize a connection-less best-efforts protocol to sending information, each transaction is fully self contained. Thus, for example, each message from a client contains information about the capabilities of the browser and is independent of any other communications for the communication to be completed. This self-contained nature of the communications between a client and a server may be referred to as "stateless" communications and increases the amount of data which must be transferred between a client and a server for a given communication.

In the context of the World Wide Web client/server applications the client may be a web browser which acts as the user interface. The web browser sends user requests to the appropriate web server and formats and displays the HTML data returned from the web server. The web browser also evaluates the HTML data to determine if there are any embedded hyper-link statements in the HTML data which would require subsequent browser requests which would then be initiated by the browser. A web server acts as the server for the client and processes the web browsers requests and returns the requested response as an HTML data portion of a HTTP data stream.

As an example of a typical world wide web communication the case of a web browser initiating a request for a "home page" from the web server illustrates the basic relationship between HTTP, HTML, TCP and the web browser and server. When the user of the web browser requests information from a specific web site, the web browser initiates communication with the web server by sending a "get" request to the web server specifying the Uniform Resource Locator (URL) of the desired web site which, for purposes of this example, may be a "home page." The URL acts as the address of the web site and is unique throughout the Internet. The web server would then obtain and supply the web browser with the HTML data corresponding to the home page specified by the URL. This operation may involve further communications on the Internet by the Internet web server or the URL may specify the server which is in the local network to which the browser is attached. The web browser would then evaluate the HTML data received as an HTTP data stream from the web server to see if there were any embedded hyper-links such as an icon or an image and, if such a hyper-link exists would initiate requests specifying the URL of the hyper-link to obtain the specified data. This data would then be incorporated into the home page and displayed to the user. As is seen in this simple example, a single user input request by a web browser may result in multiple additional requests which are automatically carried out by the web browser in response to the receipt of the HTML data corresponding to the user input request.

The basic communication structure for an Internet based system is depicted in FIG. 1. In FIG. 1 a web browser 10 communicates with a web server 20 over a communication link 15. This communication link is typically a local area network connection, wide area network connection, a connection over telephone lines or a combination thereof. The web browser 10 communicates with the web server 20 using TCP/IP. For the majority of Internet communications a web browser communicates with a web server using the generic communication protocol HTTP which is transmitted between the web browser and the web server over the TCP/IP link between the web browser and the web server. The actual data transferred between the web browser 10 and the web server 20 are HTTP data objects (e.g. HTML data) as described above. The web server 20 may be a proxy which receives web browser communications from a number of web browsers and routes them to the appropriate server.

The popularity of the web browser/web server and their common information and transport protocols, HTML and HTTP, has lead to rapid acceptance of web technology as a universal interface for network access to information. Furthermore, because the protocols and language for communication between web browsers and web servers are standardized the communication protocols and language will be the same whether a user is using Netscape Navigator™, NCSA Mosaic™, WebExplorer™ or any other web browser as their web browser to access network information. Therefore, the large installed user base for web browsers combined with the connectivity of the Internet and the ease of writing web application servers using the HTTP defined Common Gateway Interface (CGI)make web technology very attractive for a large class of forms-based applications.

At the same time that the Internet was growing in popularity and acceptance, mobile computing was also increasing in popularity. The use of laptops, notebooks, Personal Digital/Communication Assistants (PDAs/PCAs) and other portable devices has lead to an increase in demands for wireless communications. Wireless wide area networks, cellular communications and packet radio, however, suffer from common limitations if used in a web context. The high cost per byte of communications, slow response time, low bandwidth and unreliability all hamper use of wireless technology for the stateless communication protocol of the World Wide Web. Also, because the web protocol is stateless the amount of data per request and the number of communication requests transferred over the wireless connection are larger than would be necessary if the communication were not self contained. Thus, combining wireless technology, or any low-speed communication technology, with web technology seems impractical as the strength of the web technology in its universal nature exacerbates the weaknesses of the wireless technology.

OBJECTS AND SUMMARY OF THE INVENTION

In view of the above limitations it is one object of the present invention to provide a communication system which reduces the amount of data to be transferred between applications.

It is an additional object of the present invention to provide a communication system which may be used in a web browser/server environment.

It is a further object of the present invention to be compatible with existing communication protocols and languages in a low speed or wireless communication system without requiring modification of web browser or web server applications.

It is an additional object of the present invention to provide a communication system which reduces the amount of communication required between a web browser and a web server and thereby enhances performance of the communication system.

In view of these and other objects, the present invention provides for reducing the data transmitted over a communication link from a first application resident in a first computer and to a second application resident in a second computer wherein the data is transmitted over an external communication link from the first computer to the second computer. Aspects of the present invention include storing HTML data from the first application to be provided to the second application in response to specific data in a CGI request from the second application in a cache resident in the first computer to create a server base cache entry. HTML data to be provided to the second application in response to the specific data in the CGI request from the second application is also stored in a cache resident in the second computer to create a client base cache entry. CGI requests and specific data associated with the CGI requests from the second application is evaluated to determine if a client base cache entry corresponding to the evaluated CGI request and specific data exists to provide a client base form. CGI requests and specific data associated with the CGI requests from the second application are interrogated to determine if a server base cache entry corresponding to the interrogated CGI request and specific data exists to provide a server base form. The data stream corresponding to the response HTML data from the first application in response to the interrogated CGI request and the specific data from the second application is intercepted prior to transmission of the response HTML data on the external communication link. The intercepted response HTML data is then compared to the server base form to provide difference data corresponding to the difference between the intercepted response and the server base form. The difference data is then sent to the second computer over the external communication link. The difference data transmitted over the external communication link sent is acquired by the first computer and the response HTML data corresponding to the communication from the first application is reconstructed from the client/server specific data stream received over the external communication link by combining the client base form with the difference data received over the external communication link to create a response data stream corresponding to the intercepted response. The reconstructed data stream corresponding to the intercepted response HTML data is then provided to the second application.

By providing for differencing of responses to CGI requests, the present invention may reduce the amount of data transferred over an external communication link, such as a wireless link. Because responses to CGI requests may vary greatly in their data, caching multiple base forms for differencing allows for a closer match between the response data and the base form which results in less data. The use of the extended cache key based on the URL and the specific input data allows for the creation of the multiple base forms for a URL.

In a further embodiment of the present invention, the HTML data from the first application stored to create a server base cache entry and the HTML data to be provided to the second application stored to create a client base cache entry are stored with the Uniform Resource Locator (URL) of the CGI request and the specific data of the CGI request as a key to the cache entries. In such a case, the evaluation of CGI requests and specific data may include determining if a client base cache entry has a URL and specific data corresponding to the evaluated CGI request and the interrogation of CGI requests and specific data may include determining if a server base cache entry has a URL and specific data corresponding to the interrogated CGI request.

In another aspect of the present invention, a client base form is selected with the closest match to the URL and specific data. Also, then a server base form is selected which provides the closest match to the URL and specific data.

In another embodiment of the present invention, the server and client cache entries are only stored if the number of client cache entries and server cache entries corresponding to the CGI request is less than a predetermined maximum entry value.

In still another embodiment of the present invention, it is determined if the server base form is identical to the client base form. The server base form and the difference data are then transmitted to the second computer over the external communication link if the server base form is not identical to the client base form. Then the intercepted response data stream corresponding to the response from the first application is reconstructed by combining the server base form received over the external communication link with the difference data received over the external communication link to create a data stream corresponding to the intercepted response. The client base form corresponding to the interrogated request is also updated by storing the received server base form as the client base cache entry corresponding to the interrogated request.

In particular embodiments of the present invention, the first application comprises a web server and the second application comprises a web browser. Furthermore, the external communication link may be a wireless communication link.

In another embodiment of the present invention a base form for a CGI response differencing communication system is generated by storing the input elements of a CGI input form and storing the parameters of a request using the CGI input form. When the response to the request using the CGI input form is received, an extended cache key is generated from the URL of the CGI request, the input elements of the CGI input form and the parameters of the CGI request using the CGI input form. The response to the request is then stored as an entry in a cache using the extended cache key as a key to the cache entry. The extended cache key may be generated by generating an extension to a URL of the CGI request including non-default parameters of the request to provide an extension string and appending the extension string to the URL of the CGI request.

In a further aspect of the present invention, input parameters having a set of possible values greater than a predefined value are excluded from the extension string. Text element values may also be excluded from the extension string.

In further aspects of the present invention, difference data between an entry in the cache having a first extended cache key and a subsequent response to a CGI request having the same extended cache key is generated and transmitted over an external communication link. Furthermore, a CGI response may be reconstructed from difference data associated with the extended cache key and the cache entry associated with the extended cache key.

As will be appreciated by those of skill in this art, the above described aspects of the present invention may also be provided as an apparatus or a program product having computer-readable program means.

DETAILED DESCRIPTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

FIGS. 3 to 8 are flowchart illustrations of methods and systems according to the invention. It will be understood that each block of the flowchart illustrations, and combinations of blocks in the flowchart illustrations, can be implemented by computer program instructions. These computer program instructions may be loaded onto a computer or other programmable apparatus to produce a machine, such that the instructions which execute on the computer or other programmable apparatus create means for implementing the functions specified in the flowchart block or blocks. These computer program instructions may also be stored in a computer-readable memory that can direct a computer or other programmable apparatus to function in a particular manner, such that the instructions stored in the computer-readable memory produce an article of manufacture including instruction means which implement the function specified in the flowchart block or blocks. The computer program instructions may also be loaded onto a computer or other programmable apparatus to cause a series of operational steps to be performed on the computer or other programmable apparatus to produce a computer implemented process such that the instructions which execute on the computer or other programmable apparatus provide steps for implementing the functions specified in the flowchart block or blocks.

Accordingly, blocks of the flowchart illustrations support combinations of means for performing the specified functions and combinations of steps for performing the specified functions. It will also be understood that each block of the flowchart illustrations, and combinations of blocks in the flowchart illustrations, can be implemented by special purpose hardware-based computer systems which perform the specified functions or steps, or combinations of special purpose hardware and computer instructions.

Figure 1:
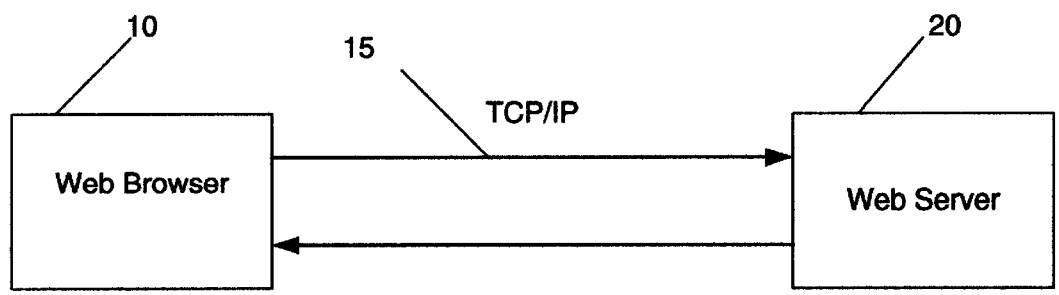
FIG. 1 is a block diagram of a typical web browser/web server system.
Figure 2:
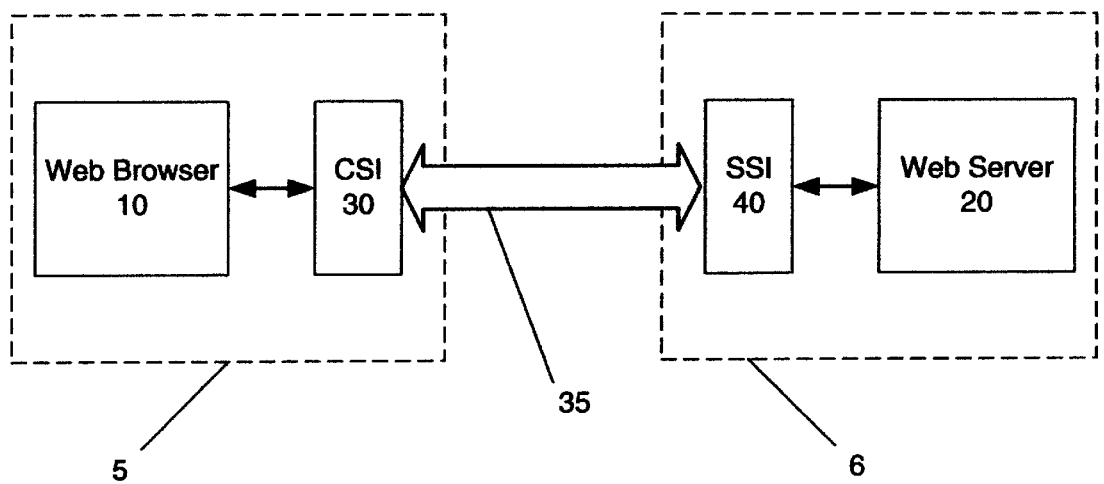
FIG. 2 is a block diagram of a web browser/web server system according to one embodiment of the present invention utilizing a client intercept and a server intercept.

FIG. 2 illustrates one embodiment of the present invention. As seen in FIG. 2, a web browser 10 communicates with a client-side intercept module 30. The web server 20 communicates with a server-side interrupt module 40. The client-side intercept module 30 then communicates with the server-side intercept module 40 over the communication link 35. The web browser 10 and the client-side intercept module 30 may be contained in a first computer 5. The server-side intercept module 40 and the web server 20 may be contained in a second computer 6. The first computer 5 and the second computer 6 communicate over external communication link 35.

Preferably, the web browser 10 is an Internet web browser utilizing hypertext transfer protocol (HTTP) and hypertext markup language (HTML) to communicate with an Internet web server 20 which also uses HTTP and HTML. In operation, the web browser 10 would output an HTTP data stream which is intercepted by the client-side intercept module 30. The intercept of the HTTP data stream by the client-side intercept module 30 may be accomplished through the use of the TCP/IP loop-back feature where the client side intercept module 30 resides at an IP address having a network number of 127, such as 127.0.0.1. The client-side intercept module 30 then converts or transforms the HTTP data stream into a client/server specific protocol and transmits the client/server specific data stream onto the external communication link 35. The server-side intercept module 40 receives the client/server specific data stream and reconstructs the original HTTP data stream corresponding to the web browser originated communication. This reconstructed HTTP data stream is then transferred to the web server 20. The web server 20 responds to the HTTP data stream in the normal manner of an Internet web server. As will be appreciated by one of skill in the art, the web server 20 may also be a proxy which allows multiple browsers to connect to the Internet.

When information is received by the web server 20 for transmission to the web browser 10, for example, in response to a browser request for a specific URL home page, the web server 20 outputs an HTTP data stream corresponding to the communication to be sent to the web browser 10. This web server originated communication is intercepted by the server-side intercept module 40 and transformed to a client/server specific data stream. The client/server specific data stream corresponding to the web server originated communication is then sent on the external communication link 35 from the second computer to the first computer. The client/server specific data stream is received by the client-side intercept module 30 and the original HTTP data stream corresponding to the web server originated communication is rebuilt and provided to the web browser 10.

In a particular embodiment of the present invention, the external communication link 35 is a wireless communication link. In such a case, in order to obtain system performance which is acceptable to users, it is desirable to reduce the amount of communication over the external communication link 35 both in the frequency of the communications and in the amount of information which must be transferred over the communication link 35. Accordingly, the present invention utilizes caching, differencing, and protocol reduction techniques to minimize the amount of communication required over the external communication link 35. These techniques are accomplished by converting the stateless or stochastic protocols of HTTP into a client/server specific protocol which utilizes information specific to the client and the server to reduce the amount and frequency of communications.

The present invention preferably utilizes a virtual socket system such as is illustrated in commonly assigned U.S. patent application Ser. No. 08/601,804 entitled CLIENT/SERVER COMMUNICATION SYSTEM, the disclosure of which is incorporated herein by reference as if set forth fully. The present invention also preferably utilizes the data reduction techniques described in commonly assigned U.S. patent application Ser. No. 08/601,753 entitled TIME COHERENT CACHING SYSTEM, and in commonly assigned U.S. patent application Ser. No. 08/601,903 entitled DIFFERENCING COMMUNICATION SYSTEM, the disclosures of which is incorporated herein by reference as if set forth fully. The present invention also preferably utilizes the rebasing techniques described in commonly assigned U.S. patent application Ser. No. 08/819,222 entitled METHOD AND APPARATUS FOR OPTIMAL REBASING OF WEB PAGE TRANSMISSION, the disclosure of which is incorporated herein by reference as if set forth fully.

While the present invention has and will be described with respect to a single web browser application and a single web server application, as will be appreciated by those of skill in this art, the benefits and advantages of the present invention may also be achieved with multiple web browsers associated with a single web server. Thus, the methods, apparatus and program products of the present invention may be used in connection with multiple browsers each communicating with a client-side intercept module and these client side intercept modules would then communicate with the server-side intercept module of the web server or web proxy.

In one embodiment of the present invention, both the client-side intercept module 30 and the server-side intercept module 40 have cache storage capabilities. The client cache resident in the first computer stores HTTP data streams to be received by the web browser in response to a web browser originated communication. The server cache resident in the second computer stores HTTP data streams which are received from the web server in response to a browser originated communication.

As will be appreciated by one of skill in the art, the cache resident in the first computer or the second computer may be of any size based upon the specific hardware configurations of the computers. These caches store information for each communication including, the URL of the communication, a unique identifier based on the communications contents such as a cyclic redundancy check (CRC) of the data of the communication, the store date time (SDT) indicating the time when the cache entry was created or refreshed and the data of the communication. Thus, a directory of cache entries may be created for each communication stored in the cache. Because of the limited resources available in any given hardware configuration, any number of caching techniques known to one of skill in the art for maintaining the caches resident in the first computer and the second computer may be utilized. For example, the cache may invalidate the oldest directory entry if a user defined cache size would be exceeded by the addition of a new entry and then the new entry added in place of the invalidated entry. Cache entries may also be maintained over multiple instances of the web browser or web server applications or even power-on cycles of the first or second computers to create a persistent cache.

In one embodiment of the present invention, the key or index into the server-side and client-side caches is the URL of the request. However, because the URL of a CGI request is the same for multiple responses, one aspect of the present invention extends the URL for a cache entry to include the data associated with a CGI request. This extension of the URL information is described in detail below. By extending the URL to include the specific data of a request the depth of the cache with respect to a CGI URL may be increased such that an increased number of cache "hits" may result for CGI requests. Thus, the amount of data transferred across the external communication link may be further reduced for the CGI requests. However, because there may be a large number of CGI requests that differ only slightly, it may be desirable to limit the number of CGI responses that are cached for any on CGI URL. Such an embodiment of the present invention is described below.

The present invention utilizes an extension to a URL entry for maintaining multiple versions of responses to a CGI request. In a typical CGI interaction, the response to an initial CGI request is a CGI form which contains HTML input elements (of the form <input type=xxx . . . > or <select . . . > . . . </select>) to specify the type of input actions presented to the end user and, for some types, the parameter values that are to be associated with a given action. The type of input elements include: checkbox; radio; text; and submit. Another HTML construct for specifying input data is a select element, which permits the selection of one or more items from a list. The submit input element is used to signal that the request half is to be submitted. Default values can be coded as part of the HTML input element specification. When the submit button is pressed, all the input parameter names and values are constructed into a linear string and sent as part of an HTTP GET or POST request to the CGI server named in the uniform resource locator defined for this form.

Figure 3:
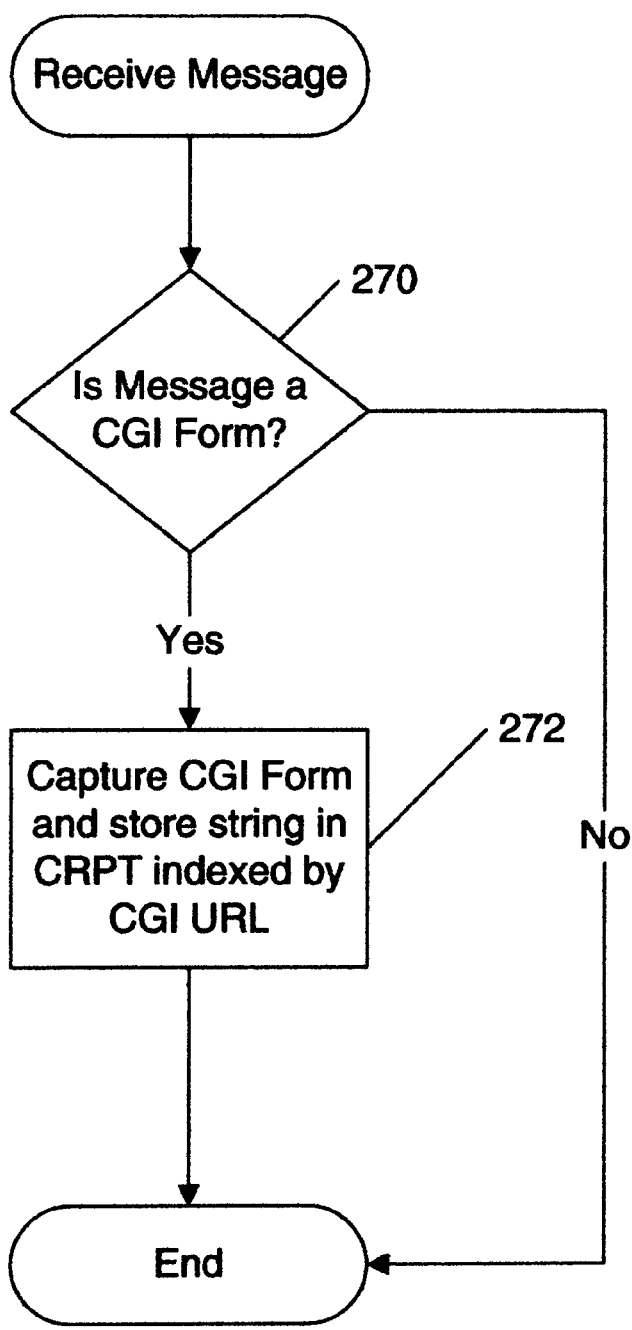
FIG. 3 is a flow diagram depicting operations carried out by both the server-side and client-side intercept modules in a preferred embodiment of the present invention.

The extended URL described above may be computed as a function of the HTTP request input parameters and values. To create the extended URL, the client-side and server-side intercept modules capture the input parameter information for a CGI form as it is passed from the web server to a web browser. This operation is illustrated in FIG. 3. As seen in FIG. 3, when either intercept module receives a message from the web server, the message is inspected to determine if the message is a CGI input form (block 270). This determination may be made, as described above, by inspecting the HTML data for the presence of a <form> element. As is seen in block 272 if a form is found, then the form's URL and all its input elements are scanned and saved in a CGI Request Parameter Table (CRPT) using the URL of the form as a key into the table. These operations occur at both the server-side intercept module 40 and the client-side intercept module 30.

Having saved the form information in the CRPT, both intercept modules may use this information to generate the extended URL keys identified above which may be used as a key into the cache resident on each computer. Thus, references herein to the use of the extended URL refers to the operations described below. To create an extended URL, when a response from a web server is received by either intercept module, the CGI of the response is used to look up in the CRPT to see if a form associated with the URL had been received. When a request is transmitted through the intercept modules a copy of the request is created at each module as a request object. If a CRPT entry is found, the parameter string is extracted from the request object corresponding to the response. This parameter string is combined with the input elements from the CRPT to generate the extended URL which is used as the cache key to look for a base form in the cache.

In computing the extended URL, the following guidelines may be used in parsing the parameter string of the request. Preferably, if a parameter matches a defined default value for the parameter the parameter is ignored. If a keyword string is passed with a null value then the parameter is also ignored in determining the extended URL. Finally, if an input element defines a parameter that can have an unlimited set of values (e.g., type="text"), then the request parameter value is ignored. Including such values leads to an unbounded number of bases for the same URL which may prove to be unmanageable for the cache.

Figure 4:
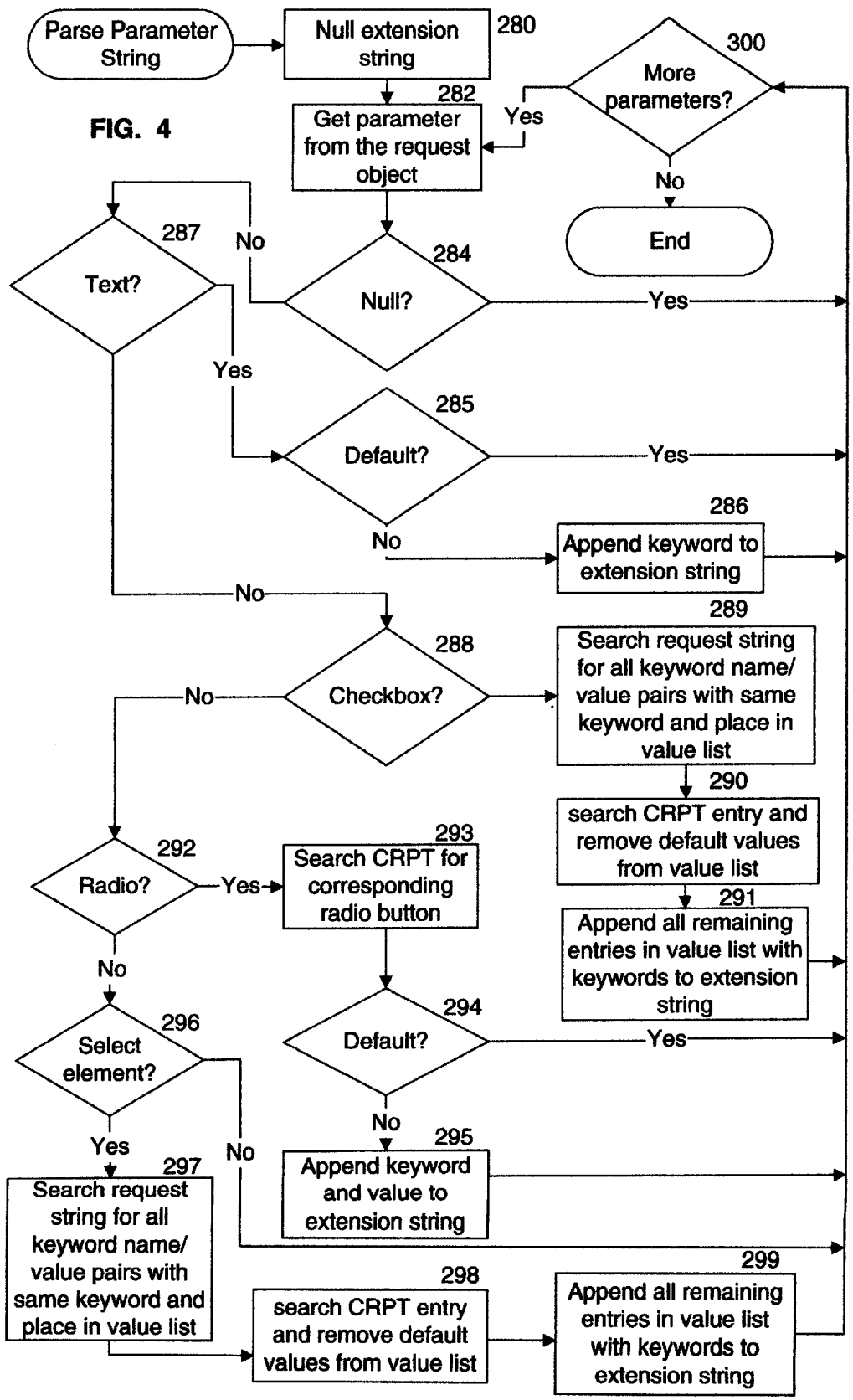
FIG. 4 is a flow diagram of the creation of an extended URL according to the present invention.

The above preferred guidelines lead to the creating of an extended URL by the operations illustrated in FIG. 4. As seen in FIG. 4, the extension to be added to the URL for use as the cache key is first nulled (block 280). Then an input parameter from the request object is obtained from the request string (block 282). If the parameter is null (block 284) then, if there are more parameters (block 300), the next parameter is obtained (block 282). Otherwise, the parsing ends (block 300). If the parameter is not null, then it is determined if the parameter is a "text" element (block 287). If the element is a text element then it is determined if the text element is set to the default value (block 285) and if so the next parameter is obtained (blocks 300 and 282). If the value is not the default then the keyword of the parameter is appended to the extension string to indicate a non-default text parameter was present (block 286).

If the parameter is not a text element, then it is determined if the parameter is a "checkbox" element (block 288). If the parameter is a checkbox element, then the request parameter string is searched for all keyword name/value pairs with the same keyword and these are placed in a temporary value list (block 289). The CRPT entry is then searched and any entries in the value list are removed if they are the default entry identified in the CRPT entry (block 290). Any remaining entries in the value list are then appended to the extension string (block 291). The next element is then obtained as described above.

If the parameter is not a checkbox, then it is determined if the parameter is a "radio" button (block 292). If the parameter is a radio element, then the CRPT entry is searched for the corresponding radio button (block 293). If the radio button is set to the default in the CRPT (block 294), then the next parameter is obtained (blocks 300 and 282). If the radio element is not set to the default, then the keyword and value are appended to the extension string (block 295). The next element is then obtained as described above.

If the parameter is not a radio element, then it is determined if the parameter is a "select" element (block 296). If the parameter is not a select element, then the next element is obtained. If the parameter is a select element, then the request parameter string is searched for all keyword name/value pairs with the same keyword and these are placed in a temporary value list (block 297). The CRPT entry is then searched and any entries in the value list are removed if they are the default entry identified in the CRPT entry (block 298). Any remaining entries in the value list are then appended to the extension string (block 299). The next element is then obtained as described above.

When all of the parameters have been processed the extension string contains the values to be added to the URL to provide the extended URL. This extended URL may then be used as described below to provide access to the server and client base caches.

As an example of the creation of the extended URL, consider an input form which contains the following elements:

<form action="http://www.mybroker.com/cgi-bin/
      status.exe" method="post">
    <input type="text" name="username" . . . >
    <input type="radio" name="invtype" value="stocks
      checked" >
    <input type="radio" name="invtype" value="bonds">
    <input type="radio" name="invtype" value="tbills">
    <input type="radio" name="invtype" value="savings">

When the input form is sent to the browser, these elements are stored as an entry in the CRPT with a key of the above URL. Then, if the HTTP request generated from filling out the form and submitting the form is:

POST www.mybroker.com/cgi-bin/status.exe
    name=Smith&invtype=tbills

The request is then sent to the server at www.mybroker.com and the CGI program, status.exe, is executed and generates a reply page that is returned to the server-side intercept module. The server-side intercept module will check the server cache to see if a base exists in order to perform the differencing. Thus, the extended URL is computed to access the server base cache. The request URL is used to locate the CRPT entry containing the input elements described above. Then using the flow illustrated in FIG. 4, the extension string to the URL is calculated as:

/name/invtype/tbills

This results in an extended URL of:

www.mybroker.com/cgi-bin/status.exe/name/invtype/
      tbills

This extended URL is then used as a key into the server cache to access the appropriate base form. A similar process takes place on the client side of the transmission link.

Figure 5:
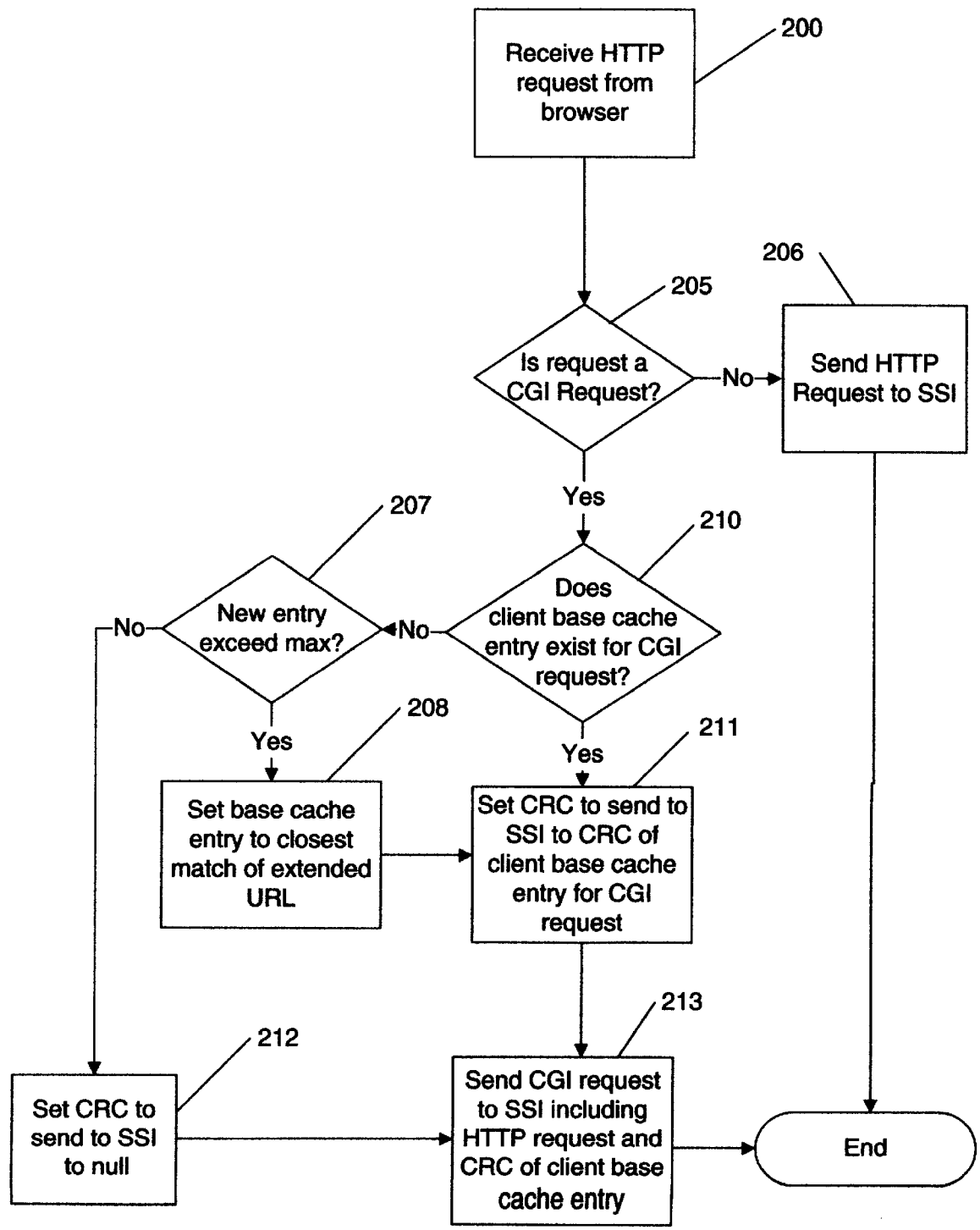
FIG. 5 is a flow diagram depicting operations associated with receiving a request from a browser carried out by a client-side intercept module in a preferred embodiment of the present invention implementing a differencing data transfer system.

The operation of the present invention utilizing the extended URL to control caches of CGI responses will now be described with reference to FIGS. 5 through 8. FIG. 5, 6, 7, and 8 reflect the operations carried out by the client-side intercept module 30 and the server-side intercept module 40 in an aspect of the present invention which utilizes differencing to reduce the data transferred over the external communication link 35. As seen in FIG. 5, block 200 illustrates the receipt by the client-side intercept module 30 of an HTTP request from the web browser 10. As reflected in block 205, the client-side intercept module 30 interrogates the intercepted HTTP request from the web browser 10 to determine if the request is to a common gateway interface (CGI). If the request is not to a common gateway interface, then the client-side intercept module 30 passes the request to the server-side intercept module as discussed in the above-referenced related application which is illustrated by block 206 of FIG. 5.

If, however, the web browser originated communication corresponds to a CGI request, then the "Yes" path out of block 205 is taken. As reflected in block 210, the client/server intercept module 30 determines if a client base cache entry exists corresponding to the HTTP data stream which was previously to be provided to the web browser in response to a corresponding CGI request. This interrogation of the CGI request may be accomplished by comparing the extended URL of the web browser originated communication to the extended URLs stored in the client base cache.

The client base cache may be initialized by storing the first HTTP data stream received by the client-side intercept module 30 which is to be provided to the web browser 10 for a given extended URL. This base cache entry may be maintained over numerous instances or sessions of the web browser 10. The client base cache entries may be updated as reflected in FIGS. 5, 6, 7, and 8. If a client base cache entry exists corresponding to the extended URL for the web browser originated communication, then the CRC to be sent to the server-side intercept module 40 over the external communication link 35 is set equal to the CRC for the client base cache entry as reflected in block 211 of FIG. 5. If no client base cache entry exists, then the "No" path out of block 210 of FIG. 5 is taken. The client side intercept 20 then determines if the creation of a new cache entry will exceed the maximum number of cache entries allowed for the URL of the CGI request (block 207). If a new entry will not exceed the maximum number of allowed entries, then the CRC for the request to be sent over the external communication link 35 to the server-side intercept module 40 is nulled. This operation is reflected in block 212 of FIG. 5.

If, however, the creation of a new entry will exceed the maximum number of entries allowed, then the base cache entry that is the closest match to the extended URL of the request is used as the client base cache entry as if there were a match (block 208). In determining the closeness of the cache entries any number of method may be utilized including using the number of matches of data elements of the extended URL with the most matches being considered "the closest" match. If multiple entries have the same number of matches then the oldest entry could be updated. The CRC sent to the server-side intercept module 40 is then set to the CRC of this substitute cache entry (block 211 and block 213).

Block 213 illustrates the operations of sending the CGI request to the server-side intercept module 40 over the external communication link. As reflected in block 213, the client-side intercept module 30 transmits the HTTP request and the request CRC which has either been set to null if no client base cache entry exists for the extended URL of the CGI request or has been set to the CRC of the client base cache entry if an entry does exist or the substitute entry as described above. Thus, the client-side intercept module has converted the CGI request to a client/server specific protocol, transmitted the client/server specific communication over the external communication link to be received by the server-side intercept module 40.

Figure 7:
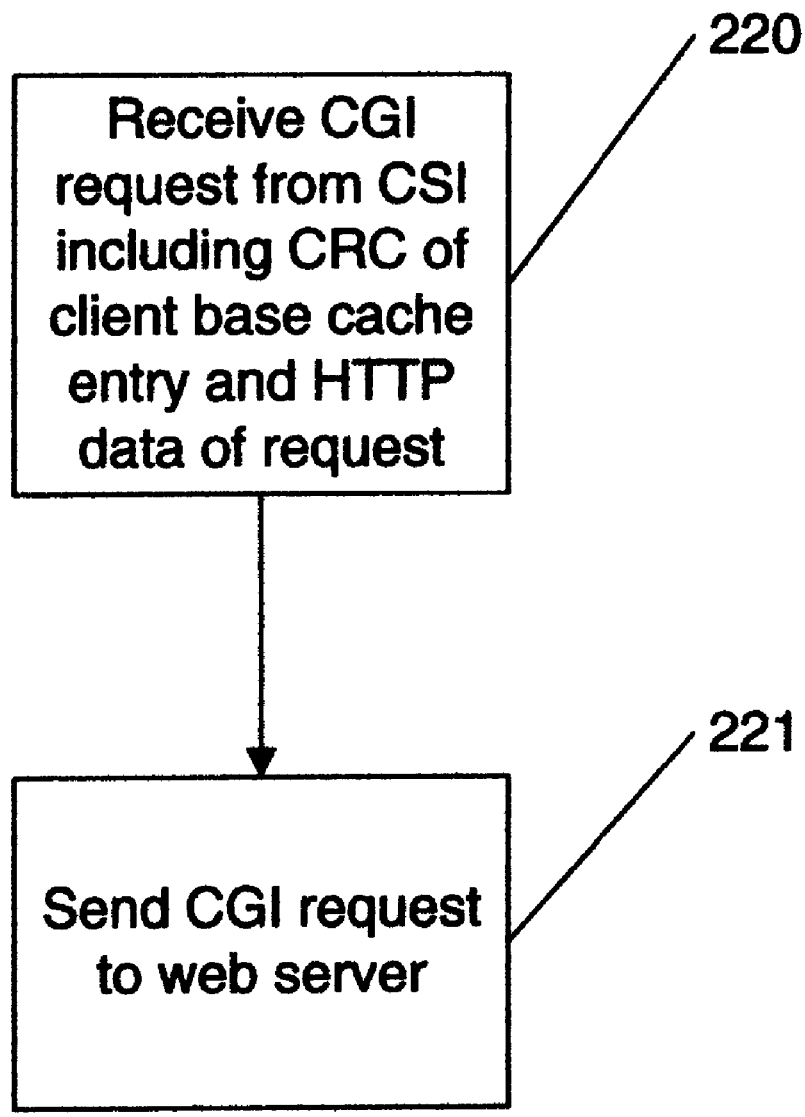
FIG. 7 is a flow diagram depicting operations associated with receiving a request from a client-side intercept module carried out by a server-side intercept module in a preferred embodiment of the present invention implementing a differencing data transfer system.

The actions taken by the server-side intercept module when a CGI request is received are reflected in FIG. 7. The receipt of the CGI request by the server-side intercept module 40 is shown in block 220. When the server-side intercept module 40 receives the CGI request, it saves a copy of the CRC value and the HTTP request. As seen in block 221, the server-side intercept module 40 passes the HTTP request to the web server 20.

Figure 8:
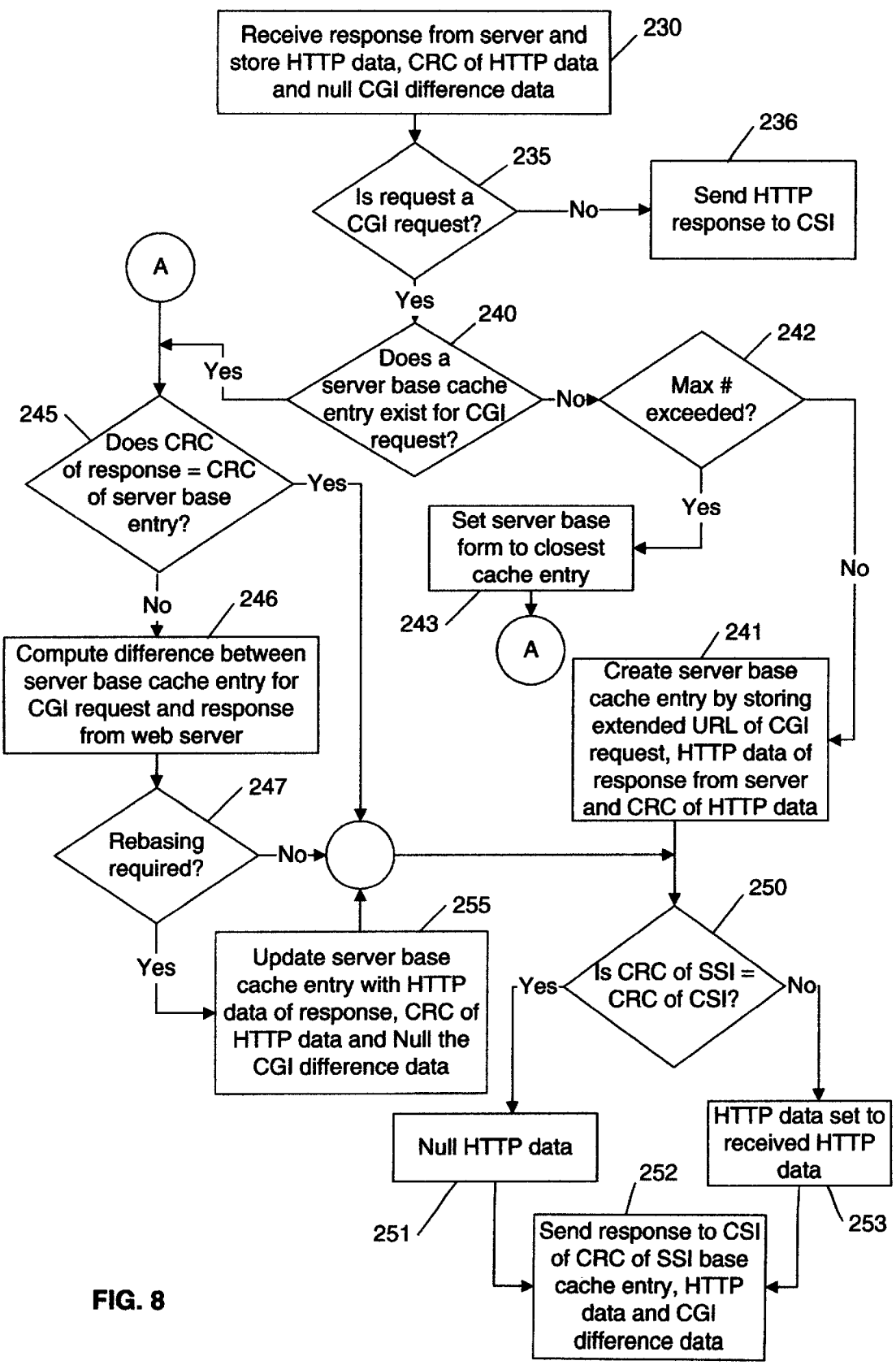
FIG. 8 is a flow diagram depicting operations associated with receiving a response carried out by a server-side intercept module in a preferred embodiment of the present invention implementing a differencing data transfer system.

When the server-side intercept module 40 receives a response to the HTTP request corresponding to the web browser originated communication or CGI request, the server-side intercept module 40 receives this response as an HTTP data stream as reflected in block 230 of FIG. 8. As seen in block 230, the server-side intercept module 40 saves the HTTP data stream and computes a CRC value for the HTTP data stream received from the web server 20. The server-side intercept module 40 also nulls the difference value to initialize the difference data. The server-side intercept module then determines if the response received as a web server originated communication is a response to a CGI request as shown in block 235. If the answer is no, then the "No" path out of block 235 of FIG. 8 is taken and the operations of block 236 are executed to send the HTTP data stream to the client-side intercept module. As reflected in block 236, this operation may involve the caching operations described in the related applications discussed above. If the response received in block 230 is a response to a CGI request, then the "Yes" path out of block 235 is taken and the server-side intercept module then determines if a server base cache entry exists for the CGI response as reflected in block 240.

A server base cache entry may be created the first time the server-side intercept module 40 receives a response to a CGI request. In this instance the result of the conditional reflected in block 240 will cause the "No" path to be taken out of block 240. The server-side intercept module 40 will then determine if the creation of a server cache entry will exceed a predetermined maximum number of entries allowed for a given CGI URL (block 242). If the number is not exceeded, then the server-side intercept module 40 creates a server base cache entry corresponding to the CGI request by storing the extended URL for the CGI, the HTTP data stream for the response to the CGI request, and the CRC for the HTTP data stream. This operation is reflected in block 241. To be compatible with the coherent cache system described in the related applications discussed above, the server base cache entry may also include the Storage Date Time. As used herein, the term server CGI base form refers to the server base cache entry corresponding to the CGI request received from the web browser 10.

If the creation of a server base cache entry would cause the number of cache entries associated with a CGI URL to be exceeded, then the server base cache entry with the closest extended URL will be selected as the server base form (block 243). In determining the closeness of the cache entries any number of methods may be utilized including using the number of matches of data elements of the extended URL with the most matches being considered "the closest" match. The operations of the server-side intercept module 40 may be carried out using the same operations described below for differencing with a server CGI base form except that the extended URL for the form will be the closest extended URL rather than the actual extended URL of the CGI request.

If a server base cache entry exists corresponding to the CGI request then the "Yes" path out of block 240 is taken. Also, if the creation of a new cache entry would exceed the maximum allowed number of base forms for a CGI's URL, then the following operations are performed using the closest matched server cache entry as described above. The server-side intercept module compares the CRC of the selected server base cache entry to the CRC of the response received from the web server 20. These operations are reflected in block 245 of FIG. 8. If the CRCs are the same, then the server-side intercept module determines if the CRC for the server base cache entry corresponds to the CRC for the client base cache entry. If these two CRC values are the same, then the client base cache entry, the server base cache entry, and the response received from the web server 20 all contain the same HTTP data stream. The comparison of the server base cache entry to the client base cache entry is reflected in block 250.

If the two base cache entries are the same, then the server-side intercept module need not send the base cache entry to the client-side intercept module 30 and so, as reflected in block 251, the HTTP data stream data to be transferred to the client-side intercept module 30 is nulled. The server-side intercept module 40 then converts the HTTP data stream received from the web server 20 to a client/server specific communication protocol by transmitting the CRC of the HTTP data stream stored in the server base cache corresponding to the CGI request, the nulled HTTP data stream data and the nulled difference data to indicate that the response to the CGI request was identical to the client base cache entry, as illustrated in block 252.

Returning to block 245, if the CRC for the server base cache entry corresponding to the CGI request or the selected server base cache entry is different than the CRC for the response received from the web server in response to the CGI request originated by the web browser, then the "No" path out of block 245 is taken. The server-side intercept module 40 then carries out the operations reflected in block 246. The server-side intercept module 40 compares the intercepted CGI response to the selected server base cache entry corresponding to the intercepted CGI request ("the server CGI base form"). This comparison of the intercepted CGI response to the server CGI base form provides CGI difference data which corresponds to the difference between the intercepted CGI response and the server CGI base form.

The differencing may be performed by any method known to those of skill in the art for determining the difference between a base form and a modified form. One method of differencing suitable for use in the present invention is described in "A Cross-Platform Binary Diff" by Coppieters, *Dr. Dobb's Journal*, May 1995, pp. 32–36, the disclosure of which is incorporated herein by reference as if set forth fully. Other methods which may be used in determining the difference data include those described in *IBM Technical Disclosure Bulletin*, Vol. 22, No. 8A, January 1980 which is also incorporated herein by reference as if set forth fully.

The server-side intercept module 40 then determines if the server CGI base form requires updating as reflected in block 247. This determination may be made by any number of methods of determining if it would be more efficient to update the server base form such as are described in U.S. patent application Ser. No. 08/819,222 entitled METHOD AND APPARATUS FOR OPTIMAL REBASING OF WEB PAGE TRANSMISSION, the disclosure of which is incorporated herein by reference as if set forth fully. Other methods of determining if the server base cache entry corresponding to the CGI request should be updated may include time coherency such as that described in the related applications discussed above or other methods known to those with skill in the art to determine if the difference data has increased to such an extent that rebasing to create a new base cache entry would improve system performance.

If rebasing of the server is required, then the server base cache entry is updated with the HTTP response data and the CRC of the HTTP data (block 255). Furthermore, the difference data may be nulled as is reflected in block 255.

If rebasing of the server is not required, then the "No" path out of block 247 is taken and the server-side intercept module 40 carries out the operations of block 250 to determine if the CRC of the client base cache entry is the same as that of the selected server base cache entry. In other words, is the server CGI base form identical to a client CGI base form which are the selected base cache entries of the server and the client which correspond to the particular CGI request of the web browser originated communication or which are the closest match to the extended URL of the CGI request. If the base forms are the same, then the client does not need to be rebased and the HTTP data stream information is nulled, as reflected in block 251. The server-side intercept module 40 then sends the difference response to the client-side intercept module 30 by sending the CRC of the server base cache entry corresponding to the CGI request (i.e. the CRC of the server CGI base form), by sending the nulled HTTP data stream which would correspond to the base data and by sending the difference data determined in block 246. These operations are again reflected as block 252 of FIG. 8.

If the server-side intercept module 40 determines that the CRCs are not the same for the client CGI base form and the server CGI base form, then the client needs to be rebased. The client rebasing operation consists of sending the server CGI base form to the client-side intercept module 30. To perform this operation, the server-side intercept module sets the HTTP data stream data to be sent to the client-side intercept module 30 equal to the server CGI base form. This operation is reflected in block 253. The server-side intercept module 40 then converts the HTTP data stream received from the web server to a client/server specific protocol by sending the CRC of the server CGI base form, the HTTP data stream data corresponding to the server CGI base form, and sending the difference data between the CGI base form and the response received from the web server as seen in block 252. This information is then transmitted over the external communication link 35 to the client-side intercept module 30.

Figure 6:
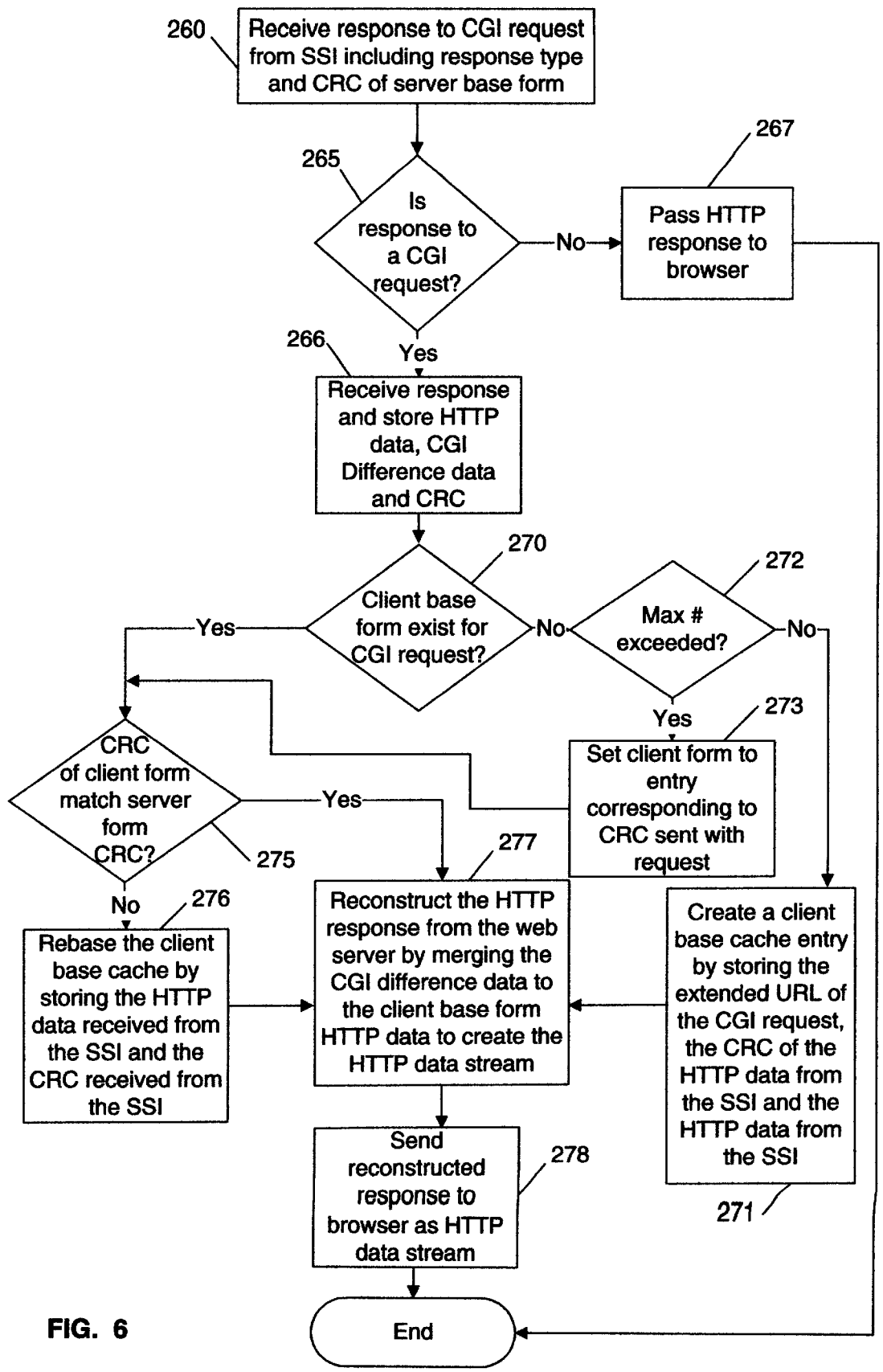
FIG. 6 is a flow diagram depicting operations associated with receiving a response from a server-side intercept module carried out by a client-side intercept module in a preferred embodiment of the present invention implementing a differencing data transfer system.

The operations of the client-side intercept module upon receipt of a response from the server-side intercept module 40 are shown in FIG. 6. The receipt of the response from the server-side intercept module 40 by the client-side intercept module 30 is reflected in block 260. As seen in block 265, the client-side intercept module 30 determines if the response is a response to a CGI request. If the response is not to a CGI request, then the client-side intercept module carries out the operations of block 267 which may include the cache operations described in the related applications discussed above. If, however, the response is to a CGI request, then the "Yes" path out of block 265 is taken. The client-side intercept module 30 saves the HTTP data stream data, the difference data, and the CRC acquired from the client/server specific data stream transmitted over the external communication link. These operations are reflected in block 266 of FIG. 6.

The client-side intercept module 30 then determines if a client base cache entry corresponding to the intercepted CGI request exists which would contain a client CGI base form. This interrogation is shown in block 270 and may be carried out by examining the extended URL of the HTTP request or HTTP response. If a client CGI base form exists, then the "Yes" path out of block 270 is taken. The client-side intercept module 30 then compares the CRC received over the external communication link to that of the CRC of the client CGI base form as shown in block 275. If they are different, then the "No" path of block 275 is taken and the client rebases by updating the CGI base form by replacing the client base cache entry corresponding to the URL of the CGI request of the web browser originated communication with the HTTP data stream data received over the external communication link 35 from the server side intercept module 40. The client base cache entry also is updated with respect to the CRC for the HTTP data stream. These operations are reflected in block 276 of FIG. 6.

If the CRC received over the external communication link 35 is the same as the CRC of the CGI base form, then the server-side intercept module server CGI base form is the same as the client-side intercept module client CGI base form and the "Yes" path out of block 275 is taken.

Whether the base forms are the same or the client is rebased, the operations reflected in block 277 are carried out by the client-side intercept module 30. Block 277 reflects the client-side intercept module 30 reconstructing the HTTP data stream corresponding to the communication from the web server 20 from the client/server specific data stream received over the external communication link 35 by combining the client CGI base form with the CGI difference data received over the external communication link 35 to create an HTTP data stream corresponding to the intercepted CGI response. As seen in block 278, this response is then provided to the web browser 10 as an HTTP data stream.

If no CGI base form exists in the client corresponding to the URL of the CGI request, then the "No" path out of block 270 of FIG. 6 is taken. The client-side intercept module 30 then determines if the creation of a new cache entry would exceed the maximum number of entries allowed for a URL of a CGI request (block 272) if such is the case, then the client base form is set to the client cache entry corresponding to the CRC which was sent with the request (blocks 208 and 211 of FIG. 5). The client-side intercept module then carries out the operations discussed above as if a client base cache hit had occurred.

If the creation of a new entry would not exceed the maximum number of allowed entries, then, as seen in block 271, the client-side intercept module 30 creates a client base cache entry corresponding to the extended URL of the CGI request by storing the extended URL, the CRC of the HTTP data stream received over the external communication link from the server-side intercept module 40, and the actual HTTP data stream data. Storing this information creates a client base cache entry corresponding to the intercepted CGI request and thus creates a client CGI base form. The client-side intercept module may then carry out the operations of block 277 by reconstructing the HTTP data stream by combining or merging the client CGI base form with the CGI difference data which may have been nulled.

The present differencing techniques may also be applied to non-CGI data. In such an instance, the server-side intercept module 40 would need to keep multiple generations of server base cache entries to allow for the possibility that client-side intercept modules of web browsers connected to the web server may have different base forms. The server-side intercept module could then compare the CRC received from the client-side intercept module with the CRC of each of the prior generations of server base forms until a match was obtained. The server-side intercept module 40 may then optionally rebase the client-side intercept module 30 or simply provide the difference data to the client-side intercept module 30. Thus, the differencing methodologies described herein with respect to the CGI request may apply equally to any HTTP request and response.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed is:

1. A method of reducing the data transmitted over a communication link from a first application resident in a first computer and from a second application resident in a second computer wherein the data is transmitted over an external communication link between the first computer and the second computer, the method comprising:

storing HTML data from the first application to be provided to the second application in response to specific data in a CGI request from the second application in a cache resident in the first computer to create a server base cache entry;

storing HTML data to be provided to the second application in response to the specific data in the CGI request from the second application in a cache resident in the second computer to create a client base cache entry;

evaluating CGI requests and specific data associated with the CGI requests from the second application to determine if a client base cache entry corresponding to the evaluated CGI request and specific data exists to provide a client base form;

interrogating CGI requests and specific data associated with the CGI requests from the second application to determine if a server base cache entry corresponding to the interrogated CGI request and specific data exists to provide a server base form;

intercepting the data stream corresponding to the response HTML data from the first application in response to the interrogated CGI request and the specific data from the second application prior to transmission of the response HTML data on the external communication link;

comparing the intercepted response HTML data to the server base form to provide difference data corresponding to the difference between the intercepted response and the server base form;

sending the difference data to the second computer over the external communication link;

acquiring the difference data transmitted over the external communication link sent by the first computer;

reconstructing the response HTML data corresponding to the communication from the first application from the client/server specific data stream received over the external communication link by combining the client base form with the difference data received over the external communication link to create a response data stream corresponding to the intercepted response; and providing the reconstructed data stream corresponding to the intercepted response HTML data to the second application.

2. The method according to claim 1, wherein said step of storing HTML data from the first application to create a server base cache entry and said step of storing HTML data to be provided to the second application to create a client base cache entry, store the Uniform Resource Locator (URL) of the CGI request and the specific data of the CGI request.

3. The method according to claim 2, wherein said step of evaluating CGI requests and specific data includes the step of determining if a client base cache entry has a URL and specific data corresponding to the evaluated CGI request; and wherein said step of interrogating CGI requests and specific data includes the step of determining if a server base cache entry has a URL and specific data corresponding to the interrogated CGI request.

4. The method according to claim 3, wherein said step of evaluating CGI requests and specific data associated with the CGI requests from the second application to determine if a client base cache entry corresponding to the evaluated CGI request and specific data exists to provide a client base form includes the step of selecting as the client base form the client base form with the closest match to the URL and specific data; and wherein said step of interrogating CGI requests and specific data associated with the CGI requests from the second application to determine if a server base cache entry corresponding to the interrogated CGI request and specific data exists to provide a server base form includes the step of selecting as the server base form the client base form with the closest match to the URL and specific data.

5. The method according to claim 1, wherein said step of storing HTML data from the first application to create a server base cache entry and said step of storing HTML data to be provided to the second application to create a client base cache entry, store such information if the number of client cache entries and server cache entries corresponding to the CGI request is less than a predetermined maximum entry value.

6. The method of claim 1 further comprising the steps of:

determining if the server base form is identical to the client base form;

wherein said sending step comprises transmitting the server base form and transmitting the difference data to the second computer over the external communication link if said determining step determines that the server base form is not identical to the client base form;

wherein said reconstructing step comprises reconstructing the intercepted response data stream corresponding to the response from the first application by combining the server base form received over the external communication link with the difference data received over the external communication link to create a data stream corresponding to the intercepted response; and updating the client base form corresponding to the interrogated request by storing the received server base form as the client base cache entry corresponding to the interrogated request.

7. The method of claim 1 wherein the first application comprises a web server and the second application comprises a web browser.

8. The method of claim 1 wherein the external communication link comprises a wireless communication link.

9. A method of generating a base form for a CGI response differencing communication system, the method comprising:

storing the input elements of a CGI input form;

storing the parameters of a request using the CGI input form;

receiving the response to the request using the CGI input form;

generating an extended cache key from the URL of the CGI request, the input elements of the CGI input form and the parameters of the CGI request using the CGI input form; and storing as an entry in a cache the response to the request using the extended cache key as a key to the cache entry.

10. The method according to claim 9, wherein said step of generating an extended cache key comprises the steps of:

generating an extension to a URL of the CGI request including non-default parameters of the request to provide an extension string; and appending to the URL of the CGI request the extension string to provide the extended cache key.

11. The method according to claim 10, further comprising the step of excluding from the extension string input parameters having a set of possible values greater than a predefined value.

12. The method according to claim 10, further comprising the step of excluding from the extension string text element values.

13. The method according to claim 9, further comprising the steps of:

generating difference data between an entry in the cache having a first extended cache key and a subsequent response to a CGI request having the same extended cache key; and transmitting over an external communication link the extended cache key and the difference data.

14. The method according to claim 9, further comprising the step of reconstructing a CGI response from difference data associated with the extended cache key and the cache entry associated with the extended cache key.

15. An apparatus for reducing the data transmitted over a communication link from a first application resident in a first computer and to a second application resident in a second computer wherein the data is transmitted over an external communication link from the first computer to the second computer comprising:

means for storing HTML data from the first application to be provided to the second application in response to specific data in a CGI request from the second application in a cache resident in the first computer to create a server base cache entry;

means for storing HTML data to be provided to the second application in response to the specific data in the CGI request from the second application in a cache resident in the second computer to create a client base cache entry;

means for evaluating CGI requests and specific data associated with the CGI requests from the second application to determine if a client base cache entry corresponding to the evaluated CGI request and specific data exists to provide a client base form;

means for interrogating CGI requests and specific data associated with the CGI requests from the second application to determine if a server base cache entry corresponding to the interrogated CGI request and specific data exists to provide a server base form;

means for intercepting the data stream corresponding to the response HTML data from the first application in response to the interrogated CGI request and the specific data from the second application prior to transmission of the response HTML data on the external communication link;

means for comparing the intercepted response HTML data to the server base form to provide difference data corresponding to the difference between the intercepted response and the server base form;

means for sending the difference data to the second computer over the external communication link;

means for acquiring the difference data transmitted over the external communication link sent by the first computer;

means for reconstructing the response HTML data corresponding to the communication from the first application from the client/server specific data stream received over the external communication link by combining the client base form with the difference data received over the external communication link to create a response data stream corresponding to the intercepted response; and means for providing the reconstructed data stream corresponding to the intercepted response HTML data to the second application.

16. An apparatus for generating a base form for a CGI response differencing communication system comprising:

means for storing the input elements of a CGI input form;

means for storing the parameters of a request using the CGI input form;

means for receiving the response to the request using the CGI input form;

means for generating an extended cache key from the URL of the CGI request, the input elements of the CGI input form and the parameters of the CGI request using the CGI input form; and means for storing as an entry in a cache the response to the request using the extended cache key as a key to the cache entry.

17. A computer program product for reducing the data transmitted over a communication link from a first application resident in a first computer and to a second application resident in a second computer wherein the data is transmitted over an external communication link from the first computer to the second computer, the computer program product comprising:

a computer-readable storage medium having computer-readable program code means embodied in said medium, said computer-readable program code means comprising:

computer-readable program code means for storing HTML data from the first application to be provided to the second application in response to specific data in a CGI request from the second application in a cache resident in the first computer to create a server base cache entry;

computer-readable program code means for storing HTML data to be provided to the second application in response to the specific data in the CGI request from the second application in a cache resident in the second computer to create a client base cache entry;

computer-readable program code means for evaluating CGI requests and specific data associated with the CGI requests from the second application to determine if a client base cache entry corresponding to the evaluated CGI request and specific data exists to provide a client base form;

computer-readable program code means for interrogating CGI requests and specific data associated with the CGI requests from the second application to determine if a server base cache entry corresponding to the interrogated CGI request and specific data exists to provide a server base form;

computer-readable program code means for intercepting the data stream corresponding to the response HTML data from the first application in response to the interrogated CGI request and the specific data from the second application prior to transmission of the response HTML data on the external communication link;

computer-readable program code means for comparing the intercepted response HTML data to the server base form to provide difference data corresponding to the difference between the intercepted response and the server base form;

computer-readable program code means for sending the difference data to the second computer over the external communication link;

computer-readable program code means for acquiring the difference data transmitted over the external communication link sent by the first computer;

computer-readable program code means for reconstructing the response HTML data corresponding to the communication from the first application from the client/server specific data stream received over the external communication link by combining the client base form with the difference data received over the external communication link to create a response data stream corresponding to the intercepted response; and computer-readable program code means for providing the reconstructed data stream corresponding to the intercepted response HTML data to the second application.

18. A computer program product for generating a base form for a CGI response differencing communication system, the computer program product comprising:

a computer-readable storage medium having computer-readable program code means embodied in said medium, said computer-readable program code means comprising:

computer-readable program code means for storing the input elements of a CGI input form;

computer-readable program code means for storing the parameters of a request using the CGI input form;

computer-readable program code means for receiving the response to the request using the CGI input form;

computer-readable program code means for generating an extended cache key from the URL of the CGI request, the input elements of the CGI input form and the parameters of the CGI request using the CGI input form; and computer-readable program code means for storing as an entry in a cache the response to the request using the extended cache key as a key to the cache entry.

* * * * *